(12) United States Patent
Kim et al.

(10) Patent No.: US 8,386,873 B2
(45) Date of Patent: Feb. 26, 2013

(54) COOPERATION COMMUNICATION METHOD AND SYSTEM USING FEEDBACK SIGNAL

(75) Inventors: Seong Rag Kim, Daejeon (KR); Jun Young Nam, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 12/920,078

(22) PCT Filed: Nov. 28, 2008

(86) PCT No.: PCT/KR2008/007022
§ 371 (c)(1),
(2), (4) Date: Aug. 27, 2010

(87) PCT Pub. No.: WO2009/107925
PCT Pub. Date: Sep. 3, 2009

(65) Prior Publication Data
US 2011/0004798 A1 Jan. 6, 2011

(30) Foreign Application Priority Data
Feb. 28, 2008 (KR) .................. 10-2008-0018140

(51) Int. Cl.
*H04L 1/18* (2006.01)
(52) U.S. Cl. .............. 714/749; 455/550.1; 375/298; 710/106; 370/315
(58) Field of Classification Search ............ 714/749; 455/550.1; 375/298; 710/106; 370/315
See application file for complete search history.

(56) References Cited

U.S. PATENT DOCUMENTS

| | | | | |
|---|---|---|---|---|
| 7,380,193 | B1* | 5/2008 | Shalvi | 714/746 |
| 7,929,988 | B2* | 4/2011 | Horiuchi et al. | 455/550.1 |
| 2008/0155148 | A1* | 6/2008 | Oyman | 710/106 |
| 2008/0317168 | A1* | 12/2008 | Yang et al. | 375/298 |
| 2009/0109892 | A1* | 4/2009 | Oyman et al. | 370/315 |
| 2010/0278136 | A1* | 11/2010 | Oyman et al. | 370/330 |

FOREIGN PATENT DOCUMENTS

| | | |
|---|---|---|
| EP | 1 096 719 A2 | 5/2001 |
| KR | 10-2006-0057471 A | 5/2006 |
| KR | 10-2006-0059256 A | 6/2006 |
| KR | 10-2007-0009835 A | 1/2007 |
| KR | 10-2007-0063917 A | 6/2007 |
| KR | 10-2007-0114663 A | 12/2007 |
| WO | 2005-008947 A1 | 1/2005 |

OTHER PUBLICATIONS

PCT International Search Report of PCT Application No. PCT/KR2008/007022 filed Nov. 28, 2008.
PCT Written Opinion of the International Search Authority for PCT Application No. PCT/KR2008/007022 filed Nov. 28, 2008.

* cited by examiner

*Primary Examiner* — Sam Rizk
(74) *Attorney, Agent, or Firm* — Kile Park Goekjian Reed & McManus PLLC (57) ABSTRACT

Disclosed are a cooperation communication method and system using feedback signals. The cooperation communication method includes transmitting a packet to a base station by a terminal, determining, by the terminal, whether decoding of the transmitted packet is successfully performed using a feedback signal from the base station, and re-transmitting the packet to the base station by the terminal according to whether decoding of a packet of an adjacent terminal within a prescribed distance from the terminal is successfully performed.

18 Claims, 6 Drawing Sheets

COOPERATION COMMUNICATION METHOD AND SYSTEM USING FEEDBACK SIGNAL

TECHNICAL FIELD

The present invention relates to a cooperation communication method and system using feedback signals, and more particularly, to a cooperation communication method and system using feedback signals in which, in an Orthogonal Frequency Division Multiple Access communication scheme, a terminal far from a base station from among a plurality of terminals may effectively transmit a packet with assistance of another terminal near the base station using feedback signals.

This work was supported by the IT R&D program of MIC/IITA. [2006-S-001-02, Development of Adaptive Radio Access and Transmission Technologies for 4th Generation Mobile Communications]

BACKGROUND ART

In general, a cooperation communication scheme is a communication scheme for effectively transmitting signals of a relay in a case of signals with a relatively weak strength due to a great distance between a radio transmitter and receiver. The relay includes a transmitter and a receiver, and may function to receive signals of an original transmitter and re-transmit the received signals, thereby enabling an original receiver to receive signals with a relatively strong strength.

In order to design the above-described cooperation communication system, a multiplexing scheme for removing interferences of signals may be applicable, and confirming whether transmitted signals have been subjected to a re-treatment upon relaying is important.

Conventional cooperation communication schemes may use a half multiplexing scheme or a multiple access scheme to reduce or eliminate interference of the signals. According to the conventional half multiplexing scheme, in a first sub-slot obtained by half-dividing a single time slot, an original transmitter transmits signals and the relay receives the signals, and in a second sub-slot, that is, the remaining sub-slot, the relay transmits the signals and the original receiver receives the signals. In this instance, since the original transmitter does not transmit the signal, the interferences of the signals may be eliminated. According to the conventional multiple access scheme, the interferences of the signals may be alleviated using various schemes as well as a Code Division Multiple Access (CDMA) scheme, and also a relaying and transmitting operation may be performed using a non-orthogonal scheme. The relay may only amplify the received signals to re-transmit the amplified signals, and perform decoding and encoding on the received signals to thereby transmit the decoded and encoded signals. In this instance, the performance may be improved when the decoding is successfully performed, otherwise, the relaying and transmitting operation are not completely performed when the decoding fails.

DISCLOSURE OF INVENTION

Technical Goals

An aspect of the present invention provides a cooperation communication method and system in which, in an Orthogonal Frequency Division Multiple Access communication scheme, a terminal far from a base station from among a plurality of terminals may effectively transmit a packet with assistance of another terminal near the base station.

An aspect of the present invention provides a cooperation communication method and system in which a terminal and a relay may re-transmit or relay a packet according to feedback signals of an upstream base station.

An aspect of the present invention provides a cooperation communication method and system in which a base station and a relay may re-transmit or relay a packet according to feedback signals of a terminal in a downstream.

Technical Solutions

According to an aspect of the present invention, there is provided an upstream cooperation communication method using feedback signals, the method including: transmitting a packet to a base station by a terminal; determining, by the terminal, whether decoding of the transmitted packet is successfully performed using a feedback signal from the base station; and re-transmitting the packet to the base station by the terminal according to whether decoding of a packet of an adjacent terminal within a prescribed distance from the terminal is successfully performed.

According to an aspect of the present invention, there is provided a downstream cooperation communication method using feedback signals, the method including: transmitting a packet to a terminal by a base station; determining, by the base station, whether decoding of the transmitted packet is successfully performed using a feedback signal from the terminal; and re-transmitting, by the base station, the packet to the terminal through an adjacent relay terminal within a prescribed distance from the terminal depending on whether the decoding of the packet is successfully performed.

According to an aspect of the present invention, there is provided an upstream cooperation communication system using feedback signals, the system including: transmitting unit to transmit a packet to a base station; a determining unit to determine whether decoding of the transmitted packet is successfully performed using a feedback signal from the base station; and a re-transmitting unit to re-transmit the packet to the base station depending on whether the decoding of the packet is successfully performed.

According to an aspect of the present invention, there is provided a downstream cooperation communication system, the system including: a transmitting unit to transmit a packet to a terminal; a determining unit to determine whether decoding of the transmitted packet is successfully performed using a feedback signal from the terminal; and a re-transmitting unit to re-transmit the packet to the terminal depending on whether the decoding of the packet is successfully performed.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
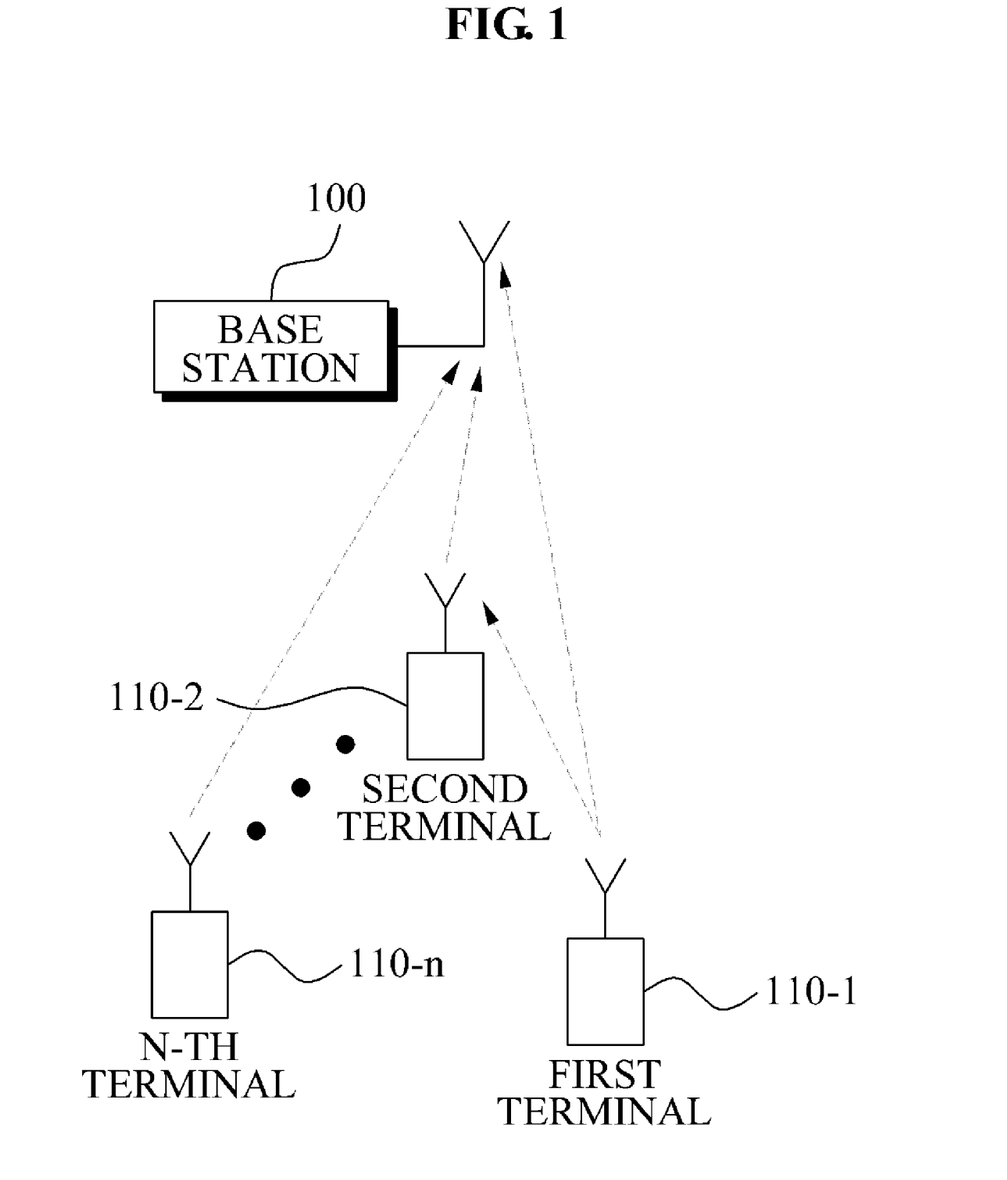
FIG. 1 is a diagram illustrating an upstream cooperation transmission method in a cooperation communication system according to an exemplary embodiment of the invention.

FIG. 1 is a diagram illustrating an upstream cooperation transmission method in a cooperation communication system according to an exemplary embodiment of the invention.

Referring to FIG. 1, a base station 100 is a final receiver of communication, and a first terminal 110-1 has a distance greater than a prescribed distance from the base station 100. Also, a second terminal 110-2 is near the base station 100, has a distance smaller than the prescribed distance from the first terminal 110-1, and acts as a relay terminal relaying signals of the first terminal 110-1.

The second terminal 110-2 may use an Amplify-and-Forward (AF) scheme or a Decode-and-Forward (DF) scheme each for relaying. Also, the second terminal 110-2 may relay in the DF scheme when packet decoding of the first terminal 110-1 is successfully performed, otherwise, relay in the AF scheme when the packet decoding fails.

The base station 100 combines packets transmitted from the first and second terminals 110-1 and 110-2 and decodes the combined packets. Specifically, the base station 100 may combine the packet transmitted from the first terminal 110-1 and the packet re-transmitted from the second terminal 110-2, and may decode the combined packets. Here, the first terminal 110-1 is a terminal intending to transmit the packet to the base station 100, and the second terminal 110-2 is a relay terminal for re-transmitting the packet instead of the first terminal 110-1 when the decoding of the packet transmitted from the first terminal 110-1 fails.

The base station 100 includes a transmitting unit transmitting the packet to the terminals 110-1 to 110-n, and a determining unit determining whether decoding of the transmitted packet is successfully performed using feedback signals from the terminals 110-1 to 110-n.

Also, each of the terminals 110-1 to 110-n includes a transmitting unit transmitting the packet to the base station 100, a determining unit whether decoding of the transmitted packet is successfully performed, and a re-transmitting unit re-transmitting, to the base station 100, the packet transmitted from an adjacent terminal through the transmitting unit when decoding of the packet transmitted from the adjacent terminal fails. Also, each of the terminals 110-1 to 110-n may re-transmit, to the adjacent terminals, the packet transmitted from the base station 100.

For the purpose of communication with the base station 100, each of the terminals 110-1 to 110-n may receive an assignment of its own channel, and transmit its own packet to the base station 100 through the channel assigned by the transmitting unit. The base station 100 may receive signals of all channels, and inform each of the terminals 110-1 to 110-n of whether decoding of the received packet has been successfully performed. A channel used for transmitting information for informing whether the decoding of the received packet has been successfully performed may be referred to as a feedback channel. Feedback signals transmitted to each of the terminals 110-1 to 110-n from the base station 100 through the feedback channel may be acknowledgment (ACK) signals when the decoding of the received packet has been successfully performed, and may be not-acknowledgement (NACK) signals when the decoding of the received packet has failed. Each of the terminals 110-1 to 110-n may assume that NACK signals are transmitted when the base station cannot perform the decoding on the signals transmitted from each of the terminals 110-1 to 110-n to fail to transmit the signals. Specifically, when the base station 100 cannot perform the decoding on the signals transmitted from each of the terminals 110-1 to 110-n, each of the terminals 110-1 to 110-n may assume that NACK signals are transmitted since the decoding itself is impossible to be performed.

Each of the terminals 110-1 to 110-n intending to transmit an original packet to the base station 100 determines that the decoding of the packet has been successfully performed when the feedback signals are received from the base station 100 by the determining unit, and determines that the decoding thereof has failed when the feedback signals are not received from the base station 100.

Each of the terminals 110-1 to 110-n acting as a relay terminal relays, by the re-transmitting unit, the packet to the base station 100 in a DF scheme when the decoding of the packet is determined to have been successfully performed, otherwise relays the packet to the base station 100 in an AF scheme when the decoding of the packet is determined to have failed.

Figure 2:
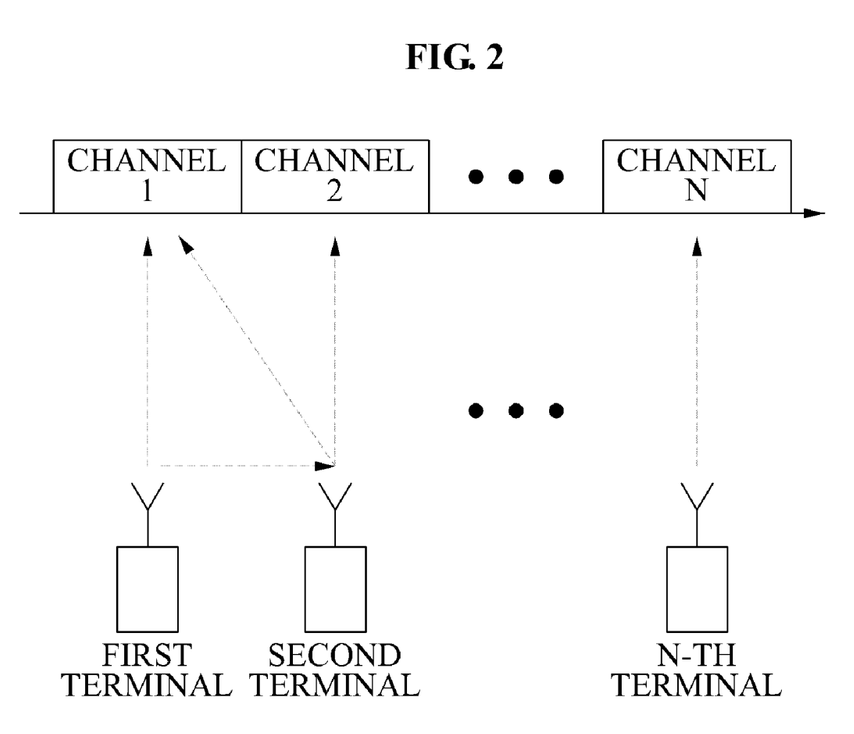
FIG. 2 is a diagram illustrating an upstream cooperation communication method according to an exemplary embodiment of the invention.

FIG. 2 is a diagram illustrating an upstream cooperation communication method according to an exemplary embodiment of the invention.

Referring to FIGS. 1 and 2, channel 1 is an upstream channel composed of several subcarrier sets assigned to the first terminal 110-1 for the purpose of communication with the base station 100, channel 2 is another upstream channel composed of several subcarrier sets assigned to the second terminal 110-2 for the same purpose, and a channel N is an upstream channel composed of several subcarrier sets assigned to the N-th terminal 110-n for the same purpose.

Each of the terminals 110-1 to 110-n transmits the packet to the base station 100 through the channels 1 to N assigned for the purpose of communication with the base station. The base station 100 transmits the ACK signals to each of the terminals 110-1 to 110-n when the decoding of the packet transmitted from each of the terminals 110-1 to 110-n is successfully performed, otherwise transmits the NACK signals to each of the terminals 110-1 to 110-n when the decoding of the packet fails. The ACK signals may denote that the decoding of the packet transmitted from each of the terminals 110-1 to 110-n has been successfully performed, and the NACK signals may denote that the decoding thereof have failed. Thus, the terminals 110-1 to 110-n may determine whether the decoding of the packet transmitted to the base station 100 is successfully performed depending on whether the feedback signals received from the base station 100 through the feedback channel are ACK signals or NACK signals. Specifically, each of the terminals 110-1 to 110-n may determine that the decoding of the packet transmitted to the base station 100 is successfully performed when the received feedback signals are the ACK signals. Also, each of the terminals 110-1 to 110-n may determine that the decoding thereof fails when the received feedback signals are the NACK signals.

When the second terminal 110-2 is used as the relay terminal, relaying is carried out using the channel 1 of the first terminal 110-1, that is, an original terminal required for relaying without a separate relay channel, and thus the relaying is carried out while not affecting its own transmission.

Figure 3:
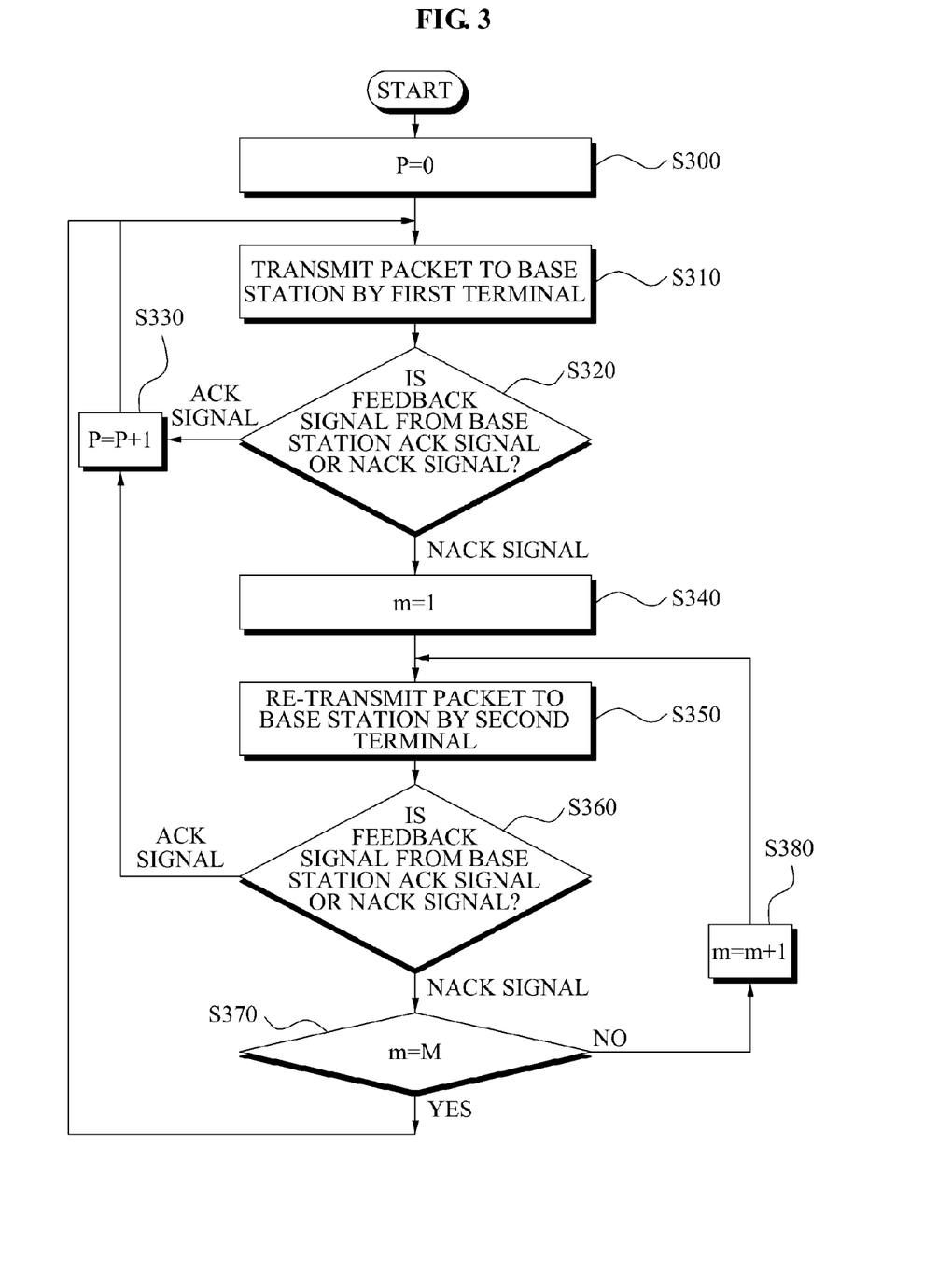
FIG. 3 is a flowchart illustrating an upstream cooperation communication method according to an exemplary embodiment of the invention.

FIG. 3 is a flowchart illustrating an upstream cooperation communication method according to an exemplary embodiment of the invention.

Referring to FIGS. 1 to 3, since operation S300 may be an initial state of upstream cooperation communication before the first terminal 110-1 transmits the packet, a number of the transmitted packets (P) is '0' (P=0). Here, for convenience of description, the first terminal 110-1 is assumed to be a target terminal requiring cooperation communication since it is located to be far from the base station 100, and the second terminal 110-2 is assumed to be a terminal located between the base station 100 and the first terminal 110-1. The second terminal 110-2 may correspond to at least one terminal set except the first terminal 110-1, as necessary, and may correspond to a fixed relay.

In operation S310, the first terminal 110-1 transmits the packet to the base station 100 through its own channel 1. The base station 100 performs decoding on the packet transmitted from the first terminal 110-1 through the channel 1, and the second terminal 110-2 performs decoding on the packet transmitted from the first terminal 110-1 through the channel 1. In this instance, since the second terminal 110-2 transmits the packet to the channel 2 of its own channel, the second terminal 110-2 may receive the packet of the channel 1 without any constraint, separately from its own signal transmission. The base station 100 transmits the ACK signals to the first terminal 110-1 when the packet transmitted from the first terminal 110-1 through the channel 1 is normally received and decoding of the packet therefrom is successfully performed. Also, the base station 100 transmits the NACK signals to the first terminal 110-1 when the packet transmitted from the first terminal 110-1 through the channel 1 is not normally received and decoding of the packet therefrom fails.

In operation S320, the first terminal 110-1 determines whether the feedback signal transmitted from the base station 100 is ACK signal or NACK signal. Specifically, in operation S320, the first terminal 110-1 may determine whether decoding of the packet transmitted through the channel 1 is successfully performed depending on whether the feedback signal transmitted from the base station 100 is ACK signal or NACK signal. As an example, in operation S320, the first terminal 110-1 may determine that the decoding of the packet has been successfully performed when the feedback signals are received from the base station 100, that is, in a case of ACK signals, otherwise determine that the decoding has failed when the feedback signals are not received from the base station 100, that is, in a case of NACK signals.

In operation S330, the first terminal 110-1 determines that decoding of the packet transmitted to the base station 100 has been successfully performed when the feedback signals are the ACK signals, and then increases a number of the transmitted packets (P) (P=P+1). Next, the first terminal 110-1 repeatedly performs the operations starting from operation S310. Specifically, the first terminal 110-1 may perform the operations starting from operation S310 to thereby transmit the next packet to the base station 100 when the decoding of the packet received from the first terminal 110-1 has been successfully performed by the base station 100.

In operation S340, the first terminal 110-1 sets a number (m) of times of re-transmission as '1', when the feedback signal is the NACK signal. Specifically, the first terminal 110-1 re-transmits the packet or the second terminal 110-2 re-transmits the packet to the base station 100 when the base station 100 cannot normally receive the packet transmitted from the first terminal 110-1 to thereby result in failure in the decoding, and thereby the number (m) of times of re-transmission is set as '1'. The second terminal 110-2, that is, the relay terminal relays the packet to the base station 100 in the AF scheme.

In operation S350, the second terminal 110-2 re-transmits the packet to the base station 100 through the channel 1. Specifically, the second terminal 110-2, that is, the relay terminal re-transmits the packet to the base station 100 through the channel 1 when the decoding of the packet is determined to fail.

A Signal-to-Noise ratio (S/N) is high since the second terminal 110-2 is located to be nearer the first terminal 110-1 than the base station 100, so that the re-transmission of the packet is more effectively performed by the second terminal 110-2 instead of by the first terminal 110-1. Thus, in operation S350, the second terminal 110-2 relays the packet received from the first terminal 110-1, and re-transmits to the base station 100.

In operation S360, the second terminal 110-2 determines whether the feedback signal transmitted from the base station 100 is ACK signal or NACK signal.

In operation S330, the second terminal 110-2 increases a number (P) of packets (P=P+1) transmitted to the base station 100 since the decoding of the transmitted packet has been successfully performed when the feedback signal is ACK signal. Specifically, the second terminal 110-2 may transmit the next packet when the decoding of the packet received from the second terminal 110-2 has been successfully performed by the base station 100. The second terminal 110-2, that is, the relay terminal relays the packet to the base station 100 in the DF scheme when the decoding of the packet is determined to be successfully performed.

In operation S370, the second terminal 110-2 determines whether the number (m) of times of re-transmission is a maximum number (M) of times of re-transmission when the feedback signal is the NACK signal. Here, the maximum number (M) of times of re-transmission is a parameter designed to have maximum performance according to a communication system and a channel environment.

In operation S380, the second terminal 110-2 increases the number (m) of times of re-transmission (m=m+1) when the number (m) is not the maximum number (M). Next, the second terminal 110-2 performs operations starting from operation S350 to re-transmit the packet.

Also, at least two relay terminals 110-2 to 110-n may relay and re-transmit the packet to the base station 100 when the decoding of the packet is determined to fail.

The first terminal 110-1 repeatedly performs operations starting from operation S310 when the number (m) is the maximum number (M). Specifically, the first terminal 110-1 starts the re-transmission when the packet relayed and re-transmitted by the second terminal 110-2 is re-transmitted the maximum number (M) of times of re-transmission or more. In this way, the packet transmitted to the second terminal 110-2 is determined to have an error when the second terminal 110-2 fails in re-transmission of the packet several times. Accordingly, to re-start the cooperation communication is more effective by carrying out the re-transmission by the first terminal 110-2.

Figure 4:
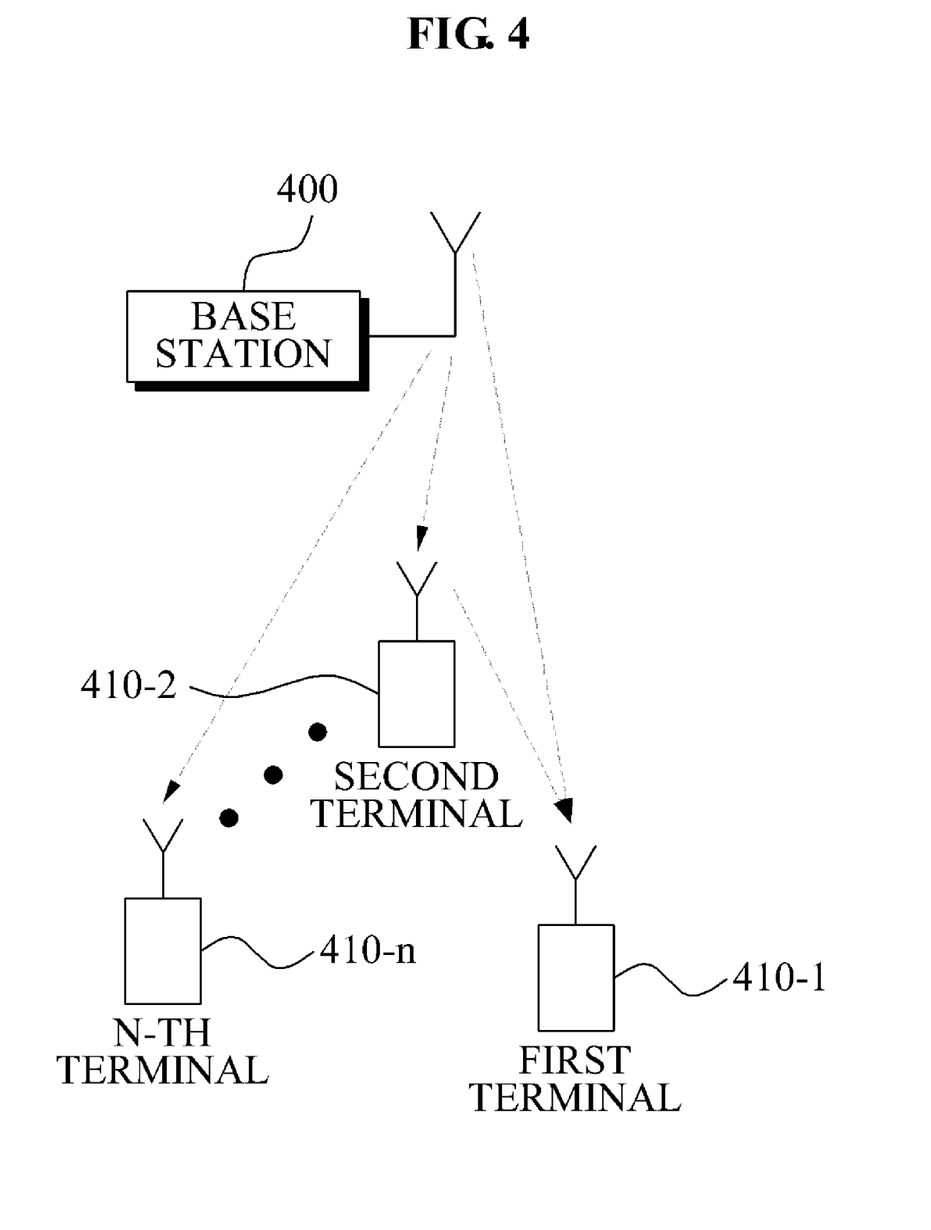
FIG. 4 is a diagram illustrating a downstream cooperation transmission method in a cooperation communication system according to an exemplary embodiment of the invention.

FIG. 4 is a diagram illustrating a downstream cooperation transmission method in a cooperation communication system according to an exemplary embodiment of the invention.

Referring to FIG. 4, a base station 400 is a device including a transmitter, and a first terminal 410-1 is a device including a terminal or final receiver having a distance with the base station 400 greater than a predetermined distance. A second terminal 410-2 is near the base station 400, acts as an adjacent terminal or a fixed relay terminal within a predetermined distance from the first terminal 410-1, and functions to relay downstream signals transmitted to the first terminal 410-1 from the base station 400. The second terminal 410-2 may use the AF scheme or DF scheme for relaying. Specifically, the second terminal 410-2 may relay in the DF scheme when decoding of the packet of the first terminal 110-1 is successfully performed, and relay in the AF scheme when the decoding thereof fails.

The first terminal 410-1 mixes packets re-transmitted by the relay terminal, that is, the second terminal 410-2 and the base station 400, and performs decoding on the mixed packets. Here, the base station 400 is a terminal intending to transmit the packet to the first terminal 410-1, and the second terminal 410-2 is a relay terminal acting as the re-transmitting unit for re-transmitting the packet instead of the base station 400 when the decoding of the packet transmitted from the base station 400 fails. The second terminal 410-2, that is, the relay terminal relays the packet to the base station 400 in the DF scheme when the decoding of the packet is determined to be successfully performed by the determining unit, otherwise relays to the base station 400 in the AF scheme when the decoding of the packet is determined to fail. In a case where the relay terminal is at least two terminals 410-2 to 410-n, the relay terminals 410-2 to 410-n relays signals of the base station 400 to a channel of the terminal 410-1 requiring relaying.

Figure 5:
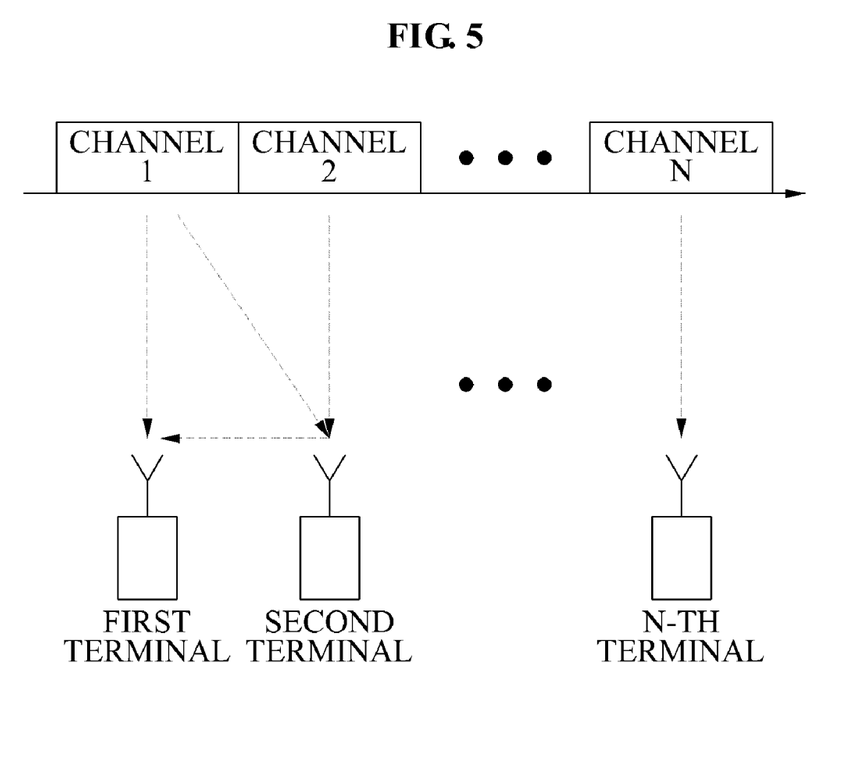
FIG. 5 is a diagram illustrating a downstream cooperation communication method according to an exemplary embodiment of the invention.

FIG. 5 is a diagram illustrating a downstream cooperation communication method according to an exemplary embodiment of the invention.

Referring to FIGS. 4 and 5, channel 1 is a downstream channel composed of several subcarrier sets assigned to the first terminal 410-1 for the purpose of communication with the base station 400, channel 2 is a downstream channel composed of several subcarrier sets assigned to the second terminal 410-2 for the same purpose, and channel N is a downstream channel composed of several subcarrier sets assigned to the N-th terminal 410-n for the same purpose.

Each of the terminals 410-1 to 410-n receives an assignment of its own orthogonal channel, and receives its own downstream packet from the base station 400 through the assigned channel. The base station 400 may transmit signals of all channels, and each of the terminals 410-1 to 410-n may inform the base station 400 of whether the received packet is normally decoded. Here, a channel for transmitting information for informing whether the received packet is normally decoded may be referred to as a feedback channel. Signals of the feedback channel may correspond to ACK signals when the received packet is normally decoded, otherwise correspond to NACK signals when the received packet is not normally decoded. The base station assumes that the NACK signals are transmitted since any signal is not transmitted when the received packet is not normally decoded. Specifically, when each of the terminals 410-1 to 410-n cannot perform the decoding on the received packet, it is assumed that the NACK signals are transmitted to the base station 400. In this instance, the base station 400 assumes that the ACK signals or the NACK signals acting as the feedback signals are normally received through the feedback channel. The base station determines that the decoding of the packet is successfully performed when the feedback signals are received from each of the terminals 410-1 to 410-n by the determining unit, otherwise determines that the decoding fails when the feedback signals are not received from each of the terminals 410-1 to 410-n.

When the second terminal 410-2 is used as the relay terminal, relaying is carried out using the channel 1 of the first terminal 410-1, that is, an original terminal requiring for relaying without a separate relay channel, and thus the relaying is carried while not affecting its own transmission.

Figure 6:
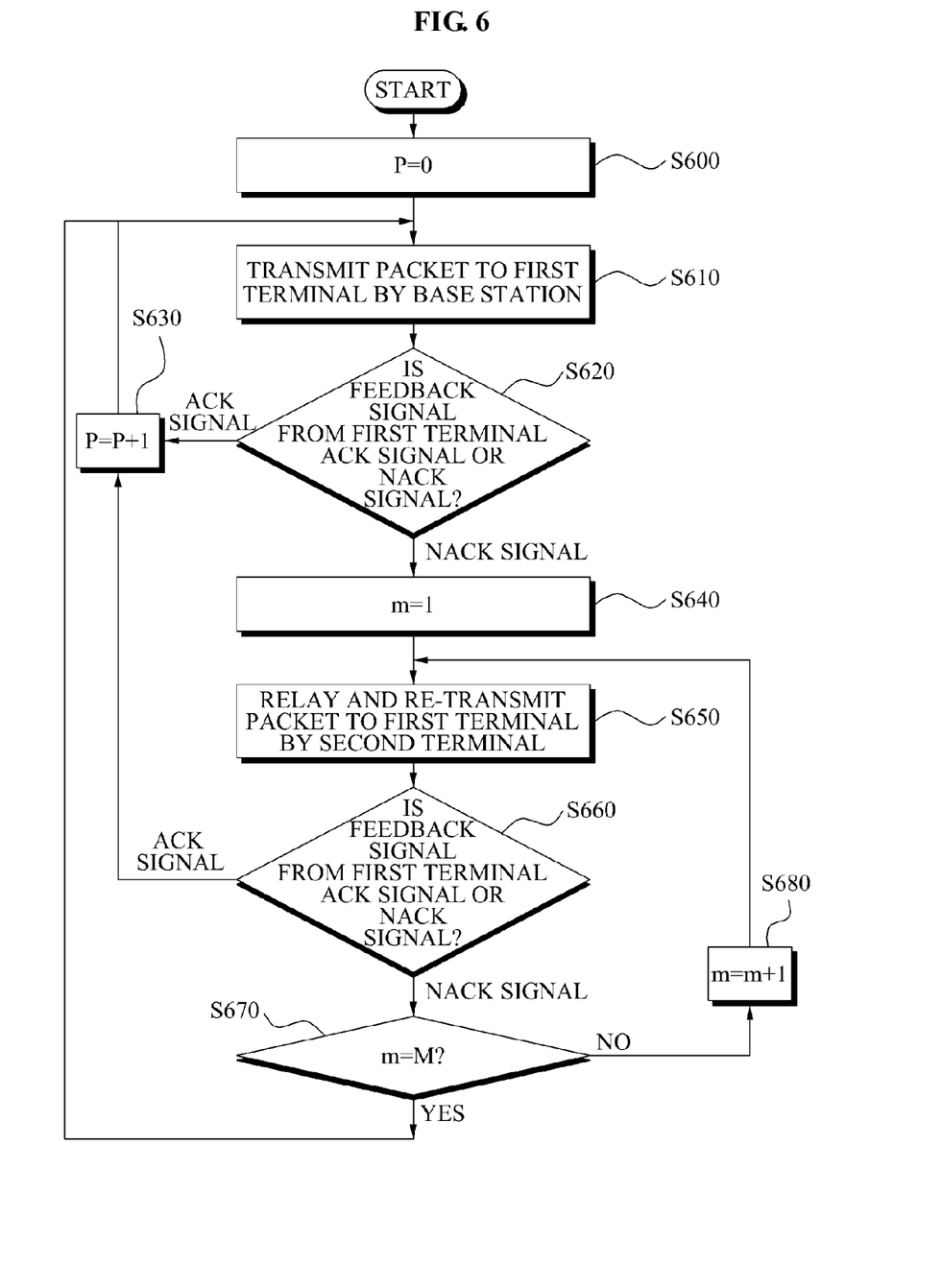
FIG. 6 is a flowchart illustrating a downstream cooperation communication method according to an exemplary embodiment of the invention.

FIG. 6 is a flowchart illustrating a downstream cooperation communication method according to an exemplary embodiment of the invention.

Referring to FIGS. 4 to 6, since operation S600 may be an initial state of upstream cooperation communication before the base station 400 transmits the packet to the first terminal 410-1, a number of the transmitted packets (P) is '0' (P=0). Here, for convenience of description, the first terminal 410-1 is assumed to be a terminal requiring cooperation communication since it is located to be far from the base station 100, and the second terminal 410-2 is assumed to be a terminal located between the base station 400 and the first terminal 410-1. The second terminal 410-2 may correspond to at least one terminal set except the first terminal 410-1, as necessary, and may correspond to a fixed relay.

In operation S610, the base station 400 transmits the packet to the first terminal 410-1 through a channel 1. Then, the first terminal 410-1 performs decoding on the packet transmitted from the base station 400 through the channel 1, and the second terminal 410-2 performs decoding on the packet transmitted from the base station 400 through a channel 2. In this instance, since the second terminal 410-2 receives the packet through the channel 2 of its own channel, the second terminal 410-2 may relay the packet of the channel 1 without any constraint, separately from its own signal transmission. The first terminal 410-1 transmits the ACK signals to the base station 400 when the packet transmitted from the base station 400 through the channel 1 is normally received and decoding of the packet therefrom is successfully performed. Also, the first terminal 410-1 transmits the NACK signals to the base station 400 when the packet transmitted from the base station 400 through the channel 1 is not normally received and decoding of the packet therefrom fails.

In operation S620, the base station 400 determines whether the feedback signal transmitted from the first terminal 410-1 is ACK signal or NACK signal. Specifically, in operation S620, the base station 400 may determine whether decoding of the packet transmitted through the channel 1 is successfully performed depending on whether the feedback signal transmitted from the first terminal 410-1 is ACK signal or NACK signal. As an example, in operation S620, the base station 400 may determine that the decoding of the packet has been successfully performed when the feedback signals are received from the first terminal 410-1, that is, in a case of ACK signals, otherwise determine that the decoding has failed when the feedback signals are not received from the first terminal 410-1, that is, in a case of NACK signals.

In operation S630, the base station 400 determines that decoding of the packet transmitted to the first terminal 410-1 has been successfully performed when the feedback signals are the ACK signals, and then increases a number of the transmitted packets (P) (P=P+1). Next, the base station 400 repeatedly performs the operations starting from operation S610. Specifically, the base station 400 may transmit the next packet to the first terminal 410-1 when the decoding of the packet received from the base station 400 has been successfully performed by the first terminal 410-1.

In operation S640, the base station 400 sets a number (m) of times of re-transmission as '1', when the feedback signal is the NACK signal. Specifically, the base station 400 re-transmits the packet to the first terminal 410-1 or the second terminal 410-2 relay and re-transmits the packet when the first terminal 410-1 cannot normally receive the packet transmitted from the base station 400 to thereby result in failure in the decoding, and thereby the number (m) of times of re-transmission is set as '1'. In this way, the second terminal 410-2, that is, the relay terminal may re-transmit the packet to the first terminal 410-1 depending on whether the decoding of the packet is successfully performed.

In operation S650, the second terminal 410-2 re-transmits the packet to the first terminal 410-1. Specifically, a Signal-to-Noise ratio (S/N) is high since the second terminal 410-2 is located to be nearer the first terminal 410-1 than the base station 100, so that the re-transmission of the packet is more effectively performed by the second terminal 410-2 instead of by the base station 400. Thus, in operation S650, the second terminal 410-2 relays the packet received from the base station 400, and re-transmits to the first terminal 410-1. In operation S650, the second terminal 410-2, that is, the relay terminal re-transmits the packet to the first terminal 410-1 using a downstream channel of the first terminal 410-1.

In operation S660, the second terminal 410-2 determines whether the feedback signal transmitted from the first terminal 410-1 is ACK signal or NACK signal.

In operation S630, the second terminal 410-2 increases a number (P) of packets (P=P+1) transmitted to the first terminal 410-1 since the decoding of the transmitted packet has been successfully performed when the feedback signal is ACK signal. Next, the base station 410 re-starts operations starting from operation S610. Specifically, the base station 400 may transmit the next packet when the decoding of the packet received from the second terminal 410-2 is successfully performed by the first terminal 410-1.

In operation S670, the second terminal 410-2 determines whether the number (m) of times of re-transmission is a maximum number (M) of times of re-transmission when the feedback signal is the NACK signal. Here, the maximum number (M) of times of re-transmission is a parameter designed to have maximum performance according to a communication system and a channel environment. The second terminal 410-2, that is the relay terminal, relays the packet to the first terminal 410-1 in the DF scheme when the decoding of the packet is determined to be successfully performed. Also, the second terminal 410-2, that is the relay terminal, may relay the packet to the first terminal 410-1 in the AF scheme when the decoding of the packet is determined to fail.

The base station 400 re-performs operations starting from operation 5610 when the number (m) is the maximum number (M). Specifically, the base station 400 starts the re-transmission when the packet relayed and re-transmitted by the second terminal 410-2 is re-transmitted the maximum number (M) of times of re-transmission or more. In this way, the packet transmitted to the second terminal 410-2 is determined to have an error when the second terminal 410-2 fails in re-transmission of the packet several times. Accordingly, to re-start the cooperation communication is more effective by carrying out the re-transmission by the base station 400.

Thus, according to the present invention, a connection range between the terminal and the base station is increased, thereby more substantially performing the transmission.

According to the present invention, another terminal near the base station acts as the relay in a multiple-terminal and multiple-channel system where the cooperation communication is performed, and a channel of each of the terminals is used in multiple channel environment, thereby realizing multiplexing without interferences.

As described above, according to the present invention, there is provided the cooperation communication method and system in which, in an Orthogonal Frequency Division Multiple Access communication scheme, a terminal far from a base station from among a plurality of terminals may effectively transmit a packet with assistance of another terminal near the base station.

According to the present invention, there is provided the cooperation communication method and system in which a terminal and a relay may re-transmit or relay a packet according to feedback signals of a base station in an upstream.

According to the present invention, there is provided the cooperation communication method and system in which a base station and a relay may re-transmit or relay a packet according to feedback signals of a terminal in a downstream.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A cooperation communication method, comprising:
receiving, by a second terminal, a first packet from a first terminal, wherein the first packet is also transmitted through a first channel to a base station by the first terminal;
transmitting a second packet through a second channel to the base station by the second terminal;
determining, by the second terminal, whether decoding of the transmitted first packet is successfully performed in the base station; and
re-transmitting the first packet through the first channel to the base station by the second terminal when the decoding of the first packet is determined to fail.

2. The cooperation communication method of claim 1, wherein the determining includes:
determining, by the second terminal, that the decoding of the transmitted first packet is successfully performed when a feedback signal is received from the base station, otherwise, determining that the decoding of the transmitted first packet fails when the feedback signal is not received from the base station in the second terminal.

3. The cooperation communication method of claim 1, wherein the re-transmitting re-transmits the first packet to the base station a predetermined number of times by the second terminal when the decoding of the first packet is determined to fail.

4. The cooperation communication method of claim 1, wherein the re-transmitting relays and re-transmits, by at least two terminals, the first packet to the base station through the first channel when the decoding of the first packet is determined to fail.

5. The cooperation communication method of claim 1, wherein the re-transmitting includes:
relaying the first packet to the base station by the second terminal in a Decode-and-Forward (DF) scheme when the decoding of the first packet is determined to be successfully performed,
otherwise relaying the first packet to the base station by the second terminal in an Amplify-and-Forward (AF) scheme when the decoding of the first packet is determined to fail.

6. A cooperation communication method, comprising:
transmitting a first packet through a first channel to a first terminal by a base station;
transmitting a second packet through a second channel to a second terminal by the base station;

determining, by the base station, whether decoding of the transmitted first packet is successfully performed using a feedback signal from the first terminal; and re-transmitting, by the base station, the first packet to the first terminal through the second terminal and through the first channel when the decoding of the first packet is determined to fail.

7. The cooperation communication method of claim 6, wherein the determining includes:

determining, by the base station, that the decoding of the first packet is successfully performed when the feedback signal is received from the first terminal, otherwise determining that the decoding of the first packet fails when the feedback signal is not received from the first terminal.

8. The cooperation communication method of claim of 6, wherein the re-transmitting re-transmits, by the base station, the first packet to the first terminal through the second terminal a predetermined number of times when the decoding of the first packet is determined to fail.

9. The cooperation communication method of claim 6, wherein the re-transmitting relays and re-transmits, by the base station, the first packet to the first terminal through at least two relay terminals when the decoding of the first packet is determined to fail.

10. The cooperation communication method of claim 6, wherein the re-transmitting includes:

relaying, by the base station, the first packet to the first terminal through the second terminal in a DF scheme when the decoding of the first packet is determined to be successfully performed; and relaying, by the base station, the first packet to the first terminal through the second terminal in an AF scheme when the decoding of the first packet is determined to fail.

11. A second terminal comprising:

a receiving unit to receive a first packet from a first terminal, wherein the first packet is also transmitted through a first channel to a base station by the first terminal;

a transmitting unit to transmit a second packet through a second channel to the base station;

a determining unit to determine whether decoding of the transmitted first packet is successfully performed in the base station; and a re-transmitting unit to re-transmit the first packet through the first channel to the base station when the decoding of the first packet is determined to fail.

12. The second terminal of claim 11, wherein the determining unit determines that the decoding of the first packet is successfully performed when a feedback signal is received from the base station, otherwise determines that the decoding of the first packet fails when the feedback signal is not received from the base station.

13. The second terminal of claim 11, wherein the re-transmitting unit relays the first packet to the base station in a DF scheme when the decoding of the first packet is determined to be successfully performed, and relays the first packet to the base station in an AF scheme when the decoding of the first packet is determined to fail.

14. The second terminal of claim 11, wherein the transmitted first packet and the re-transmitted first packet are mixed by the base station to decode the mixed packets.

15. A base station comprising:

a transmitting unit to transmit a first packet through a first channel to a first terminal, and to transmit a second packet through a second channel to a second terminal;

a determining unit to determine whether decoding of the transmitted first packet is successfully performed using a feedback signal from the first terminal; and a re-transmitting unit to re-transmit the first packet to the first terminal through the second terminal and through the first channel when the decoding of the first packet is determined to fail.

16. The base station of claim 15, wherein the determining unit determines that the decoding of the first packet is successfully performed when the feedback signal is received from the first terminal, otherwise determines that the decoding of the first packet fails when the feedback signal is not received from the first terminal.

17. The base station of claim 15, wherein the re-transmitting unit relays the first packet to the first terminal through the second terminal in a DF scheme when the decoding of the first packet is determined to be successfully performed, otherwise relays the first packet to the first terminal through the second terminal in an AF scheme when the decoding of the first packet is determined to fail.

18. The base station of claim 16, wherein the transmitted first packet transmitted from the transmitting unit and the re-transmitted first packet re-transmitted from the re-transmitting unit are mixed by the first terminal to decode the mixed packets.

* * * * *